United States Patent

Pepi Vallone et al.

Patent Number: 5,948,187
Date of Patent: Sep. 7, 1999

[54] METHOD OF MAKING A BAKERY DISPLAY

[76] Inventors: Louann Pepi Vallone, 1109 Albert Rd., North Belmore, N.Y. 11710; Peter Vallone, 11 Finch Ct., Massapequa, N.Y. 11762; Richard Vallone, 2703 Princess St., Belmore, N.Y. 11710

[21] Appl. No.: 08/779,433

[22] Filed: Jan. 7, 1997

[51] Int. Cl.$^6$ .................................................. B32B 3/00
[52] U.S. Cl. ........................... 156/63; 156/267; 428/66.5
[58] Field of Search .................... 156/63, 267, 308.2; 426/128; 428/66.5

[56] References Cited

U.S. PATENT DOCUMENTS

| | | | |
|---|---|---|---|
| 690,951 | 1/1902 | Hess | 428/66.5 |
| 2,552,297 | 5/1951 | Stanley | 428/66.5 X |
| 2,610,111 | 9/1952 | Stanley | 428/66.5 X |
| 2,829,459 | 4/1958 | Halpern | 426/128 X |
| 3,074,609 | 1/1963 | Altshuler et al. | 428/66.5 X |
| 3,548,736 | 12/1970 | Wahl, Jr. | 426/128 X |
| 4,452,356 | 6/1984 | Dahl | 426/128 |
| 4,867,303 | 9/1989 | Beekerman et al. | 426/128 X |

*Primary Examiner*—Jeff H. Aftergut

[57] ABSTRACT

A method (110) of manufacturing a bakery display (10) using the following steps: A)coating (112) a cover bottom (12B) of a cover (12) with hot melt adhesive; B) positioning (114) a cover bottom (12B) of a cover (12) over a doily top (14T) of the doily (14) until completely covered; C) utilizing (116) sufficient heat for a sufficient time period until the entire cover bottom (12B) surface affixes to the doily top (14T) forming a cover (12)/doily (14) laminate; D) cooling (118) the cover (12)/doily (14) laminate until room temperature; E)affixing (120) a doily (14) to a backing (16) by placing an adhesive between a doily bottom (14B) and a backing top (16T); and F) cutting (120) along a circumferential periphery the cover (12)/doily (14)/backing (16) laminate into a decorative cover edge (12C), a decorative doily edge (14C), and a decorative backing edge (16C) forming a bakery display (10).

9 Claims, 4 Drawing Sheets

--- coating (112) a cover bottom (12B) of a cover (12) with hot melt adhesive positioning (114) a cover bottom (12B) of a cover (12) over a doily top (14T) of the doily (14) until completely covered utilizing (116) sufficient heat for a sufficient time period until the entire cover bottom (12B) surface affixes to the doily top (14T) forming a cover (12)/doily (14) laminate cooling (118) the cover (12)/doily (14) laminate until room temperature affixing (120) a doily (14) to a backing (16) by placing an adhesive between a doily bottom (14B) and a backing top (16T)

cutting (120) along a cicumferential periphery the cover (12)/doily (14)/backing (16) laminate into a decorative cover adge (12C), a decorative doily edge (14C), and a decorative backing edge (16C) forming a backery display (10)

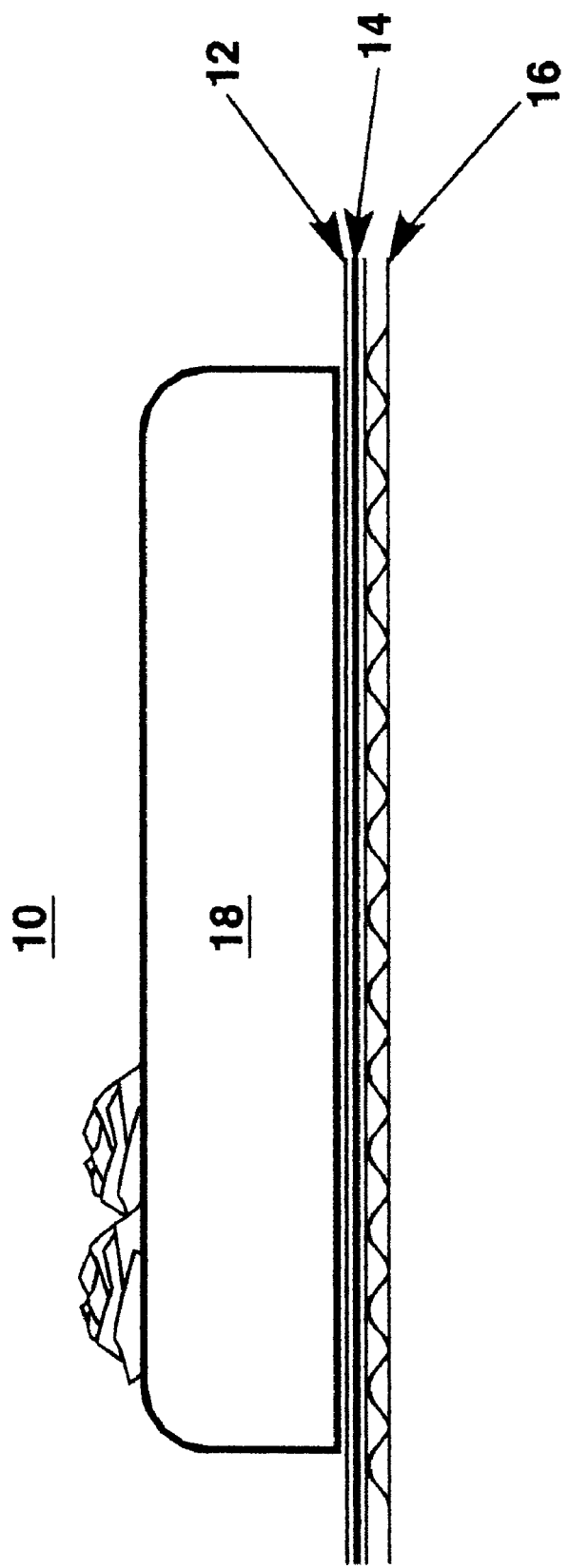

```
┌─────────────────────────────────────────────────┐
│   coating (112) a cover bottom (12B) of a cover │
│         (12) with hot melt adhesive             │
└─────────────────────────────────────────────────┘
                        │
┌─────────────────────────────────────────────────┐
│     positioning (114) a cover bottom (12B) of a │
│     cover (12) over a doily top (14T) of the doily │
│            (14) until completely covered        │
└─────────────────────────────────────────────────┘
                        │
┌─────────────────────────────────────────────────┐
│  utilizing (116) sufficient heat for a sufficiant time │
│  period until the entire cover bottom (12B) surface │
│     affixes to the doily top (14T) forming a cover │
│              (12)/doily (14) laminate           │
└─────────────────────────────────────────────────┘
                        │
┌─────────────────────────────────────────────────┐
│        cooling (118) the cover (12)/doily (14)  │
│            laminate until room temperature      │
└─────────────────────────────────────────────────┘
                        │
┌─────────────────────────────────────────────────┐
│   affixing (120) a doily (14) to a backing (16) by placing an │
│  adhesive between a doily bottom (14B) and a backing top (16T) │
└─────────────────────────────────────────────────┘
                        │
┌─────────────────────────────────────────────────┐
│   cutting (120) along a cicumferential periphery the cover │
│   (12)/doily (14)/backing (16) laminate into a decorative cover │
│   adge (12C), a decorative doily edge (14C), and a decorative │
│      backing edge (16C) forming a backery display (10) │
└─────────────────────────────────────────────────┘
```

FIG. 3

METHOD OF MAKING A BAKERY DISPLAY

BACKGROUND OF THE INVENTION

1. Field of the Invention

The present invention relates to cooking products. More particularly, the present invention relates to bake goods display trays.

2. Description of the Prior Art

The present invention is a bakery display on which bakery or pastry may be placed while being decorated and prior to the time that it is placed in a pastry box and sold to the consumer. The bakery display is characterized by the fact that it is formed of corrugated paper and has a pattern lithographed or printed on one surface. Ordinary bakery display products wick the moisture and oils from the baked item causing a staining of the bakery display product giving an unsightly appearance. Further, ordinary bakery display products are not error tolerant during the decorating phase of a product.

The purpose of bakery display products is to provide a firm base for holding the baked item during decoration. A second purpose is to provide an attractive display base while the baked item is displayed in the bakery display case. A third purpose is to facilitate transfer of cake or other pastry from the counter of a bakery into the pastry box in which it is sold.

Numerous innovations for bakery display have been provided in the prior art that are described as follows. Even though these innovations may be suitable for the specific individual purposes to which they address, they differ from the present invention as hereinafter contrasted.

In U.S. Pat. No. 476,340 titled Baking Plate for Pies issued to Wagandt comprises a baking plate for pies, cakes, etc., consisting of sheet metal having formed therein at equal distances apart depressions or recesses which extend in radial directions over the bottom, sides, and edges of the plate, and which produce upon the exterior of the bottom slightly projecting supporting ribs as and for the purposes set forth.

The patented invention differs from the disclosed invention herein because the patented invention is a metal construction and is designed to be reusable. While it is impervious to moisture it also requires a decorative doily between the bakery good and the metal. The patented invention is considerably more expensive to produce. Your invention comprises a corrugated layer protected by a plastic layer which encloses a preprinted paper layer.

In U.S. Pat. No. 1,961,342 titled Cake Plate issued to Reamer comprises a cake plate formed of a circular piece of flat molded pulp having a centrally positioned projection on the upper side thereof, said projection being pointed, and a plurality of concentric ribs formed on the lower side of said plate and all lying in the same horizontal plane.

The patented invention differs from the disclosed invention herein because the patented invention is constructed from molded pulp not corrugated materials. It does not have a paper layer or a plastic layer. The present invention does not have ribs or raised projections.

In U.S. Pat. No. 2,235,798 titled Grease Proofing Paper issued to Collings et al., comprises a method of preventing greasy and oily exudations from paper packages of products tending to give such exudates through paper, which comprises enclosing such products in paper appearing on at least one face thereof a substantially continuous superficial coating of a water soluble cellulose ether of a type whose five percent solution in water has a viscosity above 70 centiposes, the said coating being tough and flexible even at sub-zero temperatures.

The patented invention differs from the disclosed invention herein because the patented invention is a grease proof paper made by coating a wrapping paper with thin layer of cellulose ether. An alternative embodiment describes the bonding of a moistened preformed film having a water soluble cellulose ether to a paper sheet. The patented invention does not use grease proof, plastic or corrugated paper. In the present invention polypropylene is laminated to the upper surface of a rigid sheet to provide a moisture barrier.

In U.S. Pat. No. 2,610,111 titled Ornamental Cake Platter issued to Stanley comprises an ornamental cake platter comprises a relatively rigid and substantially circular base plate, a single annular ruffle including a flat inner edge portion secured to said base plate at points spaced inwardly from the marginal edge of the latter and a main body portion comprising a plurality of radial pleats projecting beyond the marginal edge of the base plate a substantially circular paper doily secured on said base plate and having an ornamental perforate marginal portion overlapping the main body portion of said ruffle, the marginal edgy of said doily being spaced inwardly from the marginal edge of the ruffle, and a substantially circular sheet of pliable transparent plastic secured to said base plate and covering said doily, the marginal edge of said transparent plastic being spaced outwardly from the marginal edge of the doily and spaced inwardly from the marginal edge of said ruffle, said doily and said base plate being substantially equal in diameter.

The patented invention comprises a circular base having multiple layers of decorative material applied in concentric circles. The decorative pattern is overlaid with plastic sheeting to protect it. While no mention is made of imprinting the paper layers, since they are decorative, adding printing or a printed pattern, would be considered an obvious and normal addition. The present invention is not fabricated from fabric, paper or doilys. Further the present invention is not stapled and it does not have raised edges.

In U.S. Pat. No. 2,829,459 titled Cake Disc issued to Halpern comprises a disposable pastry supporting article comprising a substantially flat disc shaped plate formed of normally liquid absorbent paperboard material, one side of said plate disposed to support an item of pastry, said pastry support side of said plate covered by a grease resistant coating to prevent absorption by said paperboard material or greasy substances associated with pastry said coating disposed in a pattern comprising various tones to form a decorative face on the supporting surface of said plate and said plate formed with a plurality of ridges projecting from the centermost portion of said plate to frictionally hold pastry on said surface in a relatively fixed position with respect to said plate said ridges being formed of sufficiently shallow dimension to allow the bottom portion of the cake to rest on the pastry engaging surface of said plate.

The patented invention differs from the disclosed invention herein because the patented invention is circular, having a 'grease resistant coating' where your invention is impervious to grease and liquids. Because the patented invention has ridges it cannot be inked consistently and tend to wear off on the tops of the ridges. The present invention laminates the printed paper between the base and the with polypropolene which is a significant new process. This protects the inks and creates a moisture proof, cleanable high gloss finish.

In U.S. Pat. No. 4,206,570 titled Device for Supporting a vessel issued to Cooper comprises a device for supporting a vessel, such as a flower pot and for containing water or liquid draining therefrom is disclosed. The device comprises a flat liquid impervious base covered by a layer of absorbent material which is clamped to the flat base. Sides are also included to contain liquid in excess of that, that can be absorbed by the absorbent layer.

The patented invention differs from the disclosed invention herein because the patented invention catches liquids to prevent them from spilling on a surface. It is not designed to display baked items. The upper most layer absorbs liquids it is not impervious to them.

In U.S. Pat. No. 4,605,579 titled Decorative Heat Retaining Pizza Cover issued to Armeno et al., comprises a decorative heat retaining pizza cover is disclosed which includes a member supported above the soft inner portion of the pizza by a plurality of standoffs, and tending to retain heat imparted to the pizza when the pizza is baked. The member may carry decorative legends and/or ornaments on its viewable surface indicative of a festive occasion, and the cover may be retained as a remembrance of said occasion.

The patented invention differs from the disclosed invention herein because the patented invention is a heat retaining cover designed to be installed on top of baked good to keep them warm. Your invention comprises a corrugated layer protected by a plastic layer which encloses a preprinted paper layer designed to be place under baked goods and does not retain heat by design.

Numerous innovations for a bakery display have been provided in the prior art that are adapted to be used. Even though these innovations may be suitable for the specific individual purposes to which they address, they would not be suitable for the purposes of the present invention as heretofore described.

SUMMARY OF THE INVENTION

Bakery products are displayed on decorative bases that function to provide a bottom support. The decorative base has been made up of a corrugated cardboard with a paper doily on the top surface. The baked product is placed on the doily. Typically, baked products are stored on shelves until sold to consumers. The typical paper doily permits baking oils and moisture to percolate away from the baked product edge. This results in the staining of the doily creating an unsightly appearance. This is especially a problem as the day progresses and the items have been stored on the shelf from early morning. The fragility of the baked product precludes a simple replacement of the paper doily without an inordinate risk of product damage.

Further when decorating a bakery product occasionally errors are made resulting in the accidental deposit of decorating material on to the doily. This material cannot be removed with out leaving a resulting stain on the doily. Again replacement of the doily is at great risk of damage to the baked product.

The types of problems encountered in the prior art are doilies mounted on backing become wet (wicking/capillary) effect) upon placing a bakery item thereon which makes the bakery item non-aesthetic.

In the prior art, unsucessfiul attempts to solve this problem were attempted namely: placing the bakery item on non-moisture absorbing material. However, the problem was solved by the present invention because a non-moisture cover was placed and bonded to the doily.

Innovations within the prior art are rapidly being exploited in the fields of baking and catering.

The present invention went contrary to the teaching of the art which describes placing the bakery item on a non-moisture absorbing material.

The present invention solved a long felt need for a non-moisture absorbing bakery display which is aesthetic having doily top indicia.

Accordingly, it is an object of the present invention to provide a bakery display comprising a cover, a doily, and a backing.

More particularly, it is an object of the present invention to provide the cover having a cover top, a cover bottom, and a cover edge which is cut in varying configurations depending upon preference of the user.

In keeping with these objects, and with others which will become apparent hereinafter, one feature of the present invention resides, briefly stated, in the doily comprising a doily top having doily top indicia, a doily bottom, and a doily edge which is cut in varying configurations depending upon preference of the user.

When the backing is designed in accordance with the present invention, it comprises a backing top, a backing bottom and a backing center layer which is the corrugated shape, and a backing edge which is cut in varying configurations depending upon preference of the user.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—bakery display (10)
12—cover (12)
12T—cover top (12T)
12B—cover bottom (12B)
12C—cover edge (12C)
14—doily (14)
14T—doily top (14T)
14TA—doily top indicia (14TA)
14B—doily bottom (14B)
14C—doily edge (14C)
16—backing (16)
16T—backing top (16T)
16B—backing bottom (16B)
16C—backing edge (16C)
18—bakery item (18)

BRIEF DESCRIPTION OF THE DRAWING

FIG. 2A is a cross-sectional view of a bakery display bakery item along line 2A—2A of FIG. 1.

FIG. 3 is a diagrammatic representation of a method of manufacturing a bakery display.

DESCRIPTION OF THE PREFERRED EMBODIMENT

Figure 1:
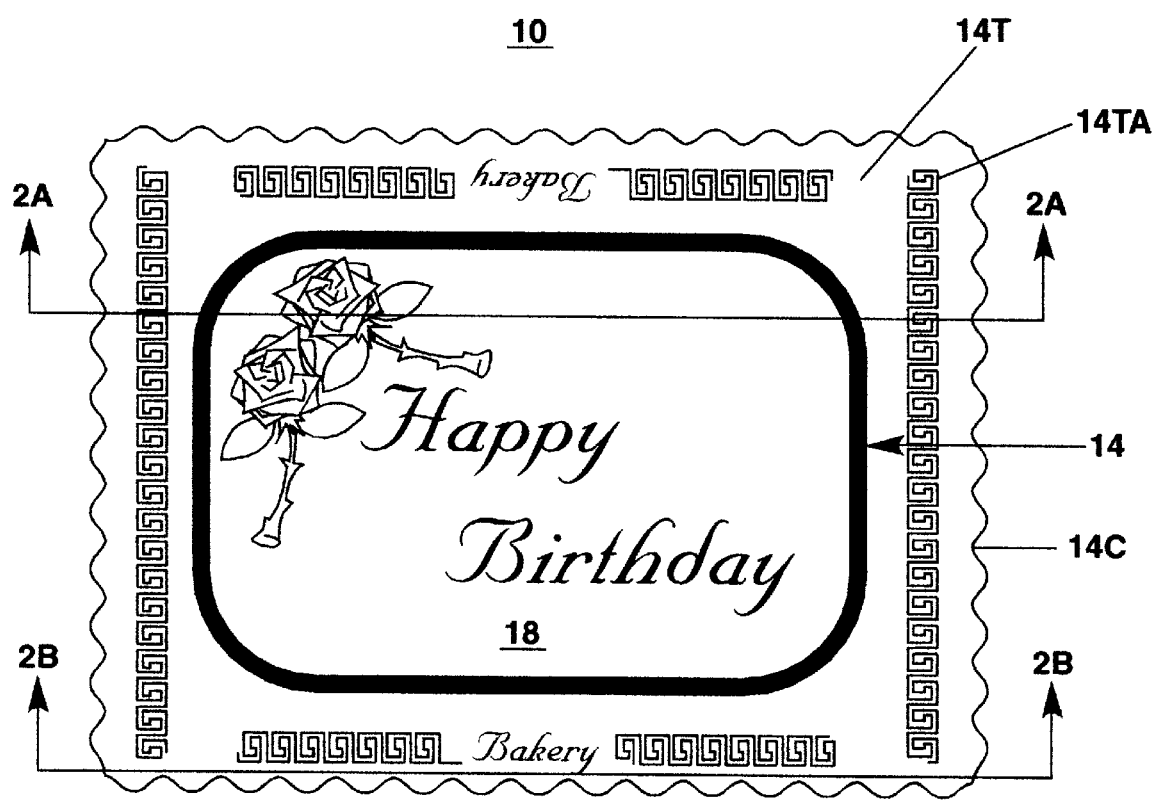
FIG. 1 is a top view of a bakery display with a bakery item displayed thereon.

Firstly, referring to FIG. 1 which is a top view of a bakery display (10) with a bakery item (18) displayed thereon. The bakery display (10) is cut into a shape selected from a group consisting of round, triangular, square, rectangular, and polygonal. The shape for a round bakery item (18) is preferably round and the shape for a rectangle bakery item (18) such as a cake is preferably rectangular. The backing bottom (16B) of the backing (16) may optionally be treated with a water resistant material such as wax to prevent moisture from transferring to a table upon which the bakery display (10) is positioned.

Referring to FIG. 2A which is a cross-sectional view of a bakery display (10) bakery item (18) along line 2A—2A of FIG. 1. The cover (12) is manufactured from a material which is hydrophobic on a cover top (12T) and hydrophilic on a cover bottom (12B) functioning to prevent moisture from entering the doily (14) and the backing (16). The advantage of the hydrophilic cover bottom (12B) allows moisture which can optionally be maintained within a backing (16) manufactured from a sponge material to be transferred through the cover bottom (12B) through the doily (14) to the bakery item (18) thereby keeping the bakery item (18) moist and not dried out.

The cover (12) is manufactured from a material which is hydrophilic on a cover top (12T) and hydrophobic on a cover bottom (12B) and the backing (16) is manufactured from an absorbent material functioning to allow excess moisture from a bakery item (18) to enter through the doily (14) to the backing (16).

Figure 2B:
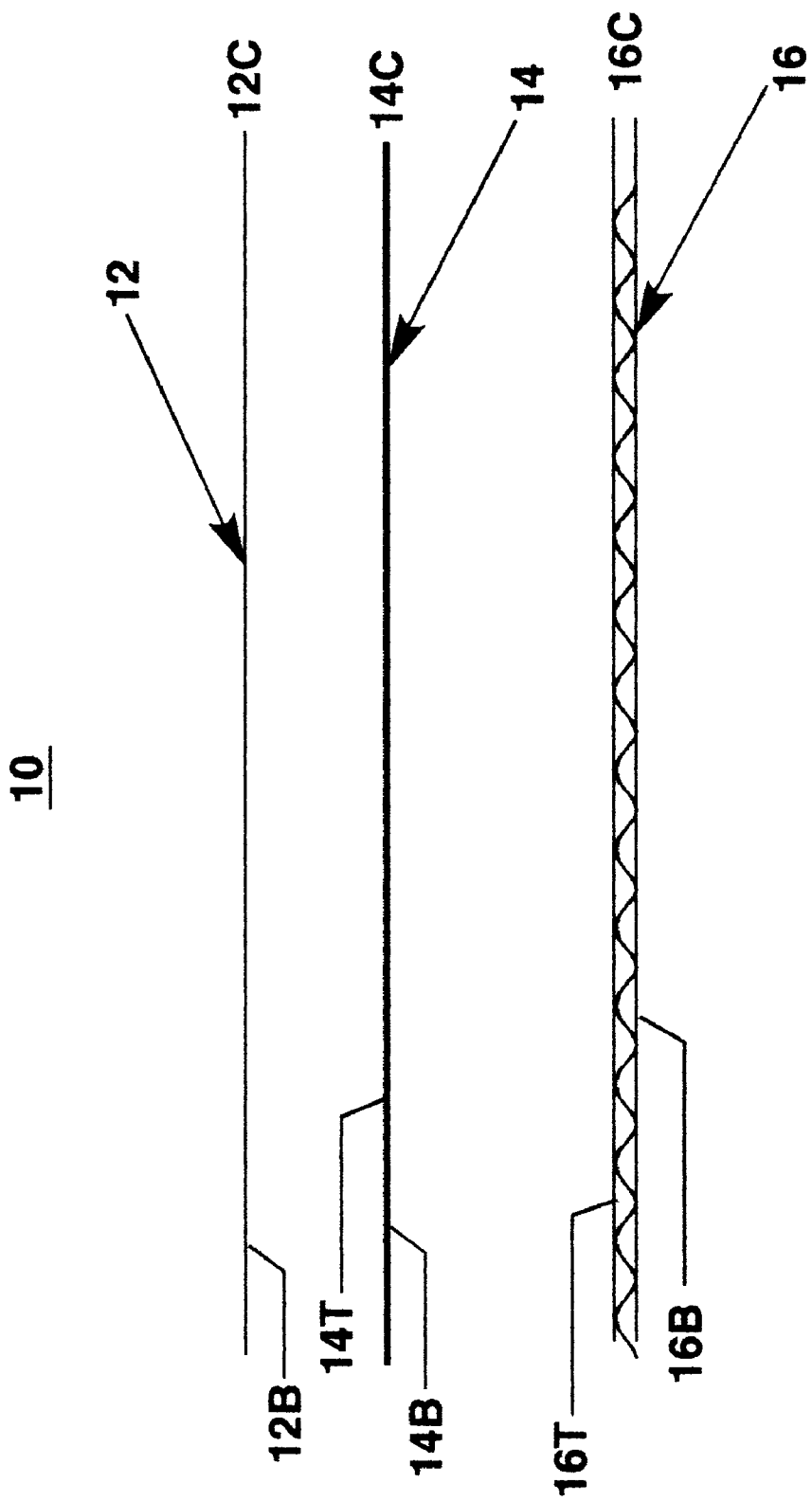
FIG. 2B is an exploded cross-sectional view of a bakery display along line 2B—2B of FIG. 1.

Now referring to FIG. 2B which is an exploded cross-sectional view of a bakery display (10) along line 2B—2B of FIG. 1. Upon lamination, the cover (12) is coated with a hot melt adhesive to bond the cover bottom (12B) to the doily top (14T). The cover (12) is manufactured from a material selected from a group consisting of plastic and plastic composite. The cover (12) is preferably manufactured from a material which is transparent. The cover (12) is optionally manufactured from a material which is translucent. The doily (14) is manufactured from a material selected from a group consisting of plastic, plastic composite, paper, paper composite, and natural fibers. The doily (14) is preferably manufactured from paper or paper composite. The doily top (14T) further comprises doily top indicia (14TA) printed thereon. The doily top indicia (14TA) can be optionally selected by the user from varying patterns upon individual preference. The backing (16) is manufactured from a material selected from a group consisting of paper, paper composite, cardboard, corrugated cardboard, sponge, wood, plastic, plastic composite, fiberglass, epoxy, metal, and metal alloy. The backing (16) is preferably manufactured from corrugated cardboard.

Lastly, referring to FIG. 3 which is a diagrammatic representation of a method (110) of manufacturing a bakery display (10). The method (110) of manufacturing a bakery display (10) consists of the following steps:

A) coating (112) a cover bottom (12B) of a cover (12) with hot melt adhesive;

B) positioning (114) a cover bottom (12B) of a cover (12) over a doily top (14T) of the doily (14) until completely covered;

C) utilizing (116) sufficient heat for a sufficient time period until the entire cover bottom (12B) surface affixes to the doily top (14T) forming a cover (12)/doily (14) laminate;

D) cooling (118) the cover (12)/doily (14) laminate until room temperature;

E) affixing (120) a doily (14) to a backing (16) by placing an adhesive between a doily bottom (14B) and a backing top (16T); and F) cutting (120) along a circumferential periphery the cover (12)/doily (14)/backing (16) laminate into a decorative cover edge (12C), a decorative doily edge (14C), and a decorative backing edge (16C) forming a bakery display (10).

The decorative cover edge (12C), the decorative doily edge (14C), and the decorative backing edge (16C) are formed simultaneously when the cover (12)/doily (14)/backing (16) laminate is cut utilizing a standard cutting die. The edges (12C, 14C, 16C) can be cut in varying patterns depending upon preference of the user.

It will be understood that each of the elements described above, or two or more together, may also find a useful application in other types of constructions differing from the type described above.

While the invention has been illustrated and described as embodied in a bakery display, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method (110) of manufacturing a bakery display (10) comprising the steps of:

A) coating (112) a cover bottom (12B) of a cover (12) with hot melt adhesive;

B) positioning (114) the cover bottom (12B) of the cover (12) over a doily top (14T) of a doily (14) until completely covered, the cover (12) is manufactured from a material which is hydrophobic on a cover top (12T) functioning to prevent moisture from entering the doily (14) and a backing (16);

C) utilizing (116) sufficient heat for a sufficient time period until the cover bottom (12B) surface affixes to the doily top (14T) forming a cover (12)/doily (14) laminate;

D) cooling (118) the cover (12)/doily (14) laminate to room temperature;

E) affixing (120) the cover (12)/doily (14) laminate to the backing (16) by placing an adhesive between a doily bottom (14B) and a backing top (16T) forming a cover (12)/doily (14)/backing (16) laminate; and F) cutting (120) along a circumferential periphery of the cover (12)/doily (14)/backing (16) laminate forming a bakery display (10).

2. The method (110) of manufacturing a bakery display (10) as described in claim 1, wherein the bakery display (10) is cut into a shape selected from a group consisting of round, triangular, square, rectangular, and polygonal.

3. The method (110) of manufacturing a bakery display (10) as described in claim 1, wherein the cover (12) is manufactured from a material which is hydrophobic on a cover bottom (12B) functioning to prevent moisture from entering the doily (14) and the backing (16).

4. The method (110) of manufacturing a bakery display (10) as described in claim 1, wherein the cover (12) is manufactured from a material selected from a group consisting of plastic and plastic composite.

5. The method (110) of manufacturing a bakery display (10) as described in claim 4, wherein the cover (12) is manufactured from a material which is transparent.

6. The method (110) of manufacturing a bakery display (10) as described in claim 4, wherein the cover (12) is manufactured from a material which is translucent.

7. The method (110) of manufacturing a bakery display (10) as described in claim 1, wherein the doily (14) is manufactured from a material selected from a group consisting of plastic, plastic composite, paper, paper composite, and natural fibers.

8. The method (110) of manufacturing a bakery display (10) as described in claim 1, wherein the backing (16) is manufactured from a material selected from a group consisting of paper, paper composite, cardboard, corrugated cardboard, sponge, wood, plastic, plastic composite, fiberglass, epoxy, metal, and metal alloy.

9. The method (110) of manufacturing a bakery display (10) as described in claim 1, wherein the doily top (14T) further comprises doily top indicia (14TA) printed thereon.

* * * * *